US012007950B2

(12) United States Patent
Aziz et al.

(10) Patent No.: US 12,007,950 B2
(45) Date of Patent: *Jun. 11, 2024

(54) SYSTEMS AND METHODS FOR CONTENT SHARING USING TEMPLATE-DRIVEN WORKFLOWS

(71) Applicant: Open Text SA ULC, Halifax (CA)

(72) Inventors: Kyle Anthony Aziz, Kitchener (CA); Scott Grasley, Guelph (CA)

(73) Assignee: OPEN TEXT SA ULC, Halifax (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/492,848

(22) Filed: Oct. 4, 2021

(65) Prior Publication Data

US 2022/0027317 A1   Jan. 27, 2022

Related U.S. Application Data

(63) Continuation of application No. 16/395,775, filed on Apr. 26, 2019, now Pat. No. 11,151,091.

(51) Int. Cl.
*G06F 16/00* (2019.01)
*G06F 16/176* (2019.01)
*H04W 12/06* (2021.01)
*H04W 12/08* (2021.01)

(52) U.S. Cl.
CPC ........ *G06F 16/176* (2019.01); *G06F 16/1774* (2019.01); *H04W 12/06* (2013.01); *H04W 12/08* (2013.01)

(58) Field of Classification Search
CPC .. G06F 16/176; G06F 16/1774; H04W 12/06; H04W 12/08; H04L 63/0428; H04L 63/102
See application file for complete search history.

(56) References Cited

U.S. PATENT DOCUMENTS

| 11,249,795 | B2 | 2/2022 | Aziz | |
|---|---|---|---|---|
| 2012/0185759 | A1* | 7/2012 | Balinsky | G06F 21/6227 715/209 |
| 2015/0163206 | A1* | 6/2015 | McCarthy | H04L 63/104 726/4 |
| 2017/0048285 | A1* | 2/2017 | Pearl | G06F 16/11 |

(Continued)

OTHER PUBLICATIONS

Office Action for U.S. Appl. No. 16/395,762, dated Jun. 23, 2021, 14 pgs.

(Continued)

*Primary Examiner* — Alexander Khong
(74) *Attorney, Agent, or Firm* — Sprinkle IP Law Group

(57) ABSTRACT

Systems and methods for cloud-based file sharing, where templates are provided for creating workflow instances which enable the sharing of managed objects. Reusable workflow templates are stored in the repository of a cloud-based file sharing system as objects that define components of the workflow, or placeholders for these components. A user instantiates a workflow instance from one of the templates and configures the workflow instance to identify content objects or forms, tasks related to the content objects, and users assigned to perform the tasks. The workflow instance is stored as an object in the repository. Users assigned to tasks are authorized through the workflow instance to access the content objects or forms to perform the tasks.

20 Claims, 11 Drawing Sheets

(56) References Cited

U.S. PATENT DOCUMENTS

| | | | |
|---|---|---|---|
| 2017/0353466 A1* | 12/2017 | Weaver | H04L 63/101 |
| 2019/0058709 A1 | 2/2019 | Kempf | |
| 2019/0155870 A1* | 5/2019 | Prakash | G06F 40/103 |
| 2020/0092331 A1 | 3/2020 | Li | |
| 2020/0167708 A1* | 5/2020 | Rajasekar | G06F 9/44526 |
| 2020/0259836 A1* | 8/2020 | Kumar | G06F 21/6209 |
| 2020/0329464 A1 | 10/2020 | Madapoosi Sampath | |
| 2022/0129300 A1 | 4/2022 | Aziz | |

OTHER PUBLICATIONS

Office Action issued for U.S. Appl. No. 17/570,118 dated Jan. 20, 2023, 14 pages.

Notice of Allowance issued for U.S. Appl. No. 17/570,118 dated Aug. 4, 2023, 10 pgs.

* cited by examiner

SYSTEMS AND METHODS FOR CONTENT SHARING USING TEMPLATE-DRIVEN WORKFLOWS

CROSS-REFERENCE TO RELATED APPLICATION(S)

This application is a continuation of, and claims a benefit of priority under 35 U.S.C. 120 of, U.S. patent application Ser. No. 16/395,775 filed Apr. 26, 2019, now U.S. Pat. No. 11,151,091, entitled "SYSTEMS AND METHODS FOR CONTENT SHARING USING TEMPLATE-DRIVEN WORKFLOWS," which is hereby incorporated herein for all purposes.

TECHNICAL FIELD

This disclosure relates generally to enterprise information management (EIM), and more particularly to EIM systems, methods and products that are implemented in networked computing environments, where access-controlled data is accessed through the use of workflows that may be instantiated from templates.

BACKGROUND OF THE RELATED ART

Enterprise information management (EIM) is a particular technical field in Information Technology (IT). EIM combines many enterprise class systems such as enterprise content management (ECM), business process management (BPM), customer experience management (CEM), and business intelligence (BI). An EIM system may utilize a content server to, among other things, store, and manage an organization or enterprise's digital assets such as content and documents (which are collectively referred to herein as "managed objects" or "content objects"). To protect these managed objects, the content server conventionally operates behind the enterprise's firewall, and is configured so that only authorized users may have secure access to the managed objects. Typically, content servers are located on the premises of the organization or enterprise (e.g., in server machines that physically reside in a building of the enterprise). This is sometimes referred to as "on-premise" or simply "on-prem".

It may be desirable for users associated with the enterprise to collaborate and/or share files with other users. ("Files" is used herein to refer to managed objects that may include documents or other types of content.) In the case of external users (those who are not associated with the enterprise or who are not on-premise) are generally not authorized to access the enterprise's EIM system. Consequently, they cannot view and/or edit any of the restricted files managed by the enterprise's content server. When the need arises for an external user to review and/or edit a file, one common option is for an enterprise user to transfer a copy of the file to a location that is accessible by the external user. For instance, the enterprise user may log into the enterprise content server from within the enterprise network where the content server resides, retrieve the file, and share a copy of the file with the external user via email or through a cloud-based storage system that is open to the public. Once that copy is shared outside of the enterprise network, it is no longer under management by the content server. The content server has no way of tracking the shared copy, getting the shared copy back to the content server, and/or updating the original file to reflect any changes made to the shared copy. Since this kind of "copy-and-set-free sharing" can pose a security risk, the sharing feature may be disabled in a content server to prevent sharing certain files, folders, directories, etc., but this leaves the need to share the file externally unaddressed.

When the need arises for an external user to review and/or edit access-controlled content, one common option is for an enterprise user to transfer a copy of the content to a location that is accessible by the external user. For instance, the enterprise user may log into the enterprise content server from within the enterprise network where the content server resides, retrieve the content, and share a copy of the content with the external user via email or through a cloud-based storage system that is open to the public. Once that copy is shared outside of the enterprise network, it is no longer under management by the content server. The content server has no way of tracking the shared copy, getting the shared copy back to the content server, and/or updating the original file to reflect any changes made to the shared copy. Since this kind of "copy-and-set-free sharing" can pose a security risk, the sharing feature may be disabled in a content server to prevent sharing certain content (e.g., files, folders, directories, etc.), but this leaves the need to share the content externally unaddressed.

It may be possible to provide content sharing capabilities in a cloud-based system. For example, in one such system, managed objects may be uploaded by authorized enterprise users to a cloud-based file sharing system. The cloud-based content sharing system may store managed objects for multiple different enterprises, and may implement security measures to ensure that only authorized users associated with a particular enterprise are allowed to access the managed objects of that enterprise. The managed objects may, for instance, be encrypted with an encryption key that is controlled by the corresponding enterprise. The enterprise may configure access permissions to the managed objects to allow access by various users (including external users), thereby allowing collaboration on the managed objects.

It would therefore be desirable to provide systems and methods that overcome or alleviate one or more of these technical problems in the prior art.

SUMMARY OF THE DISCLOSURE

Embodiments of the present invention may provide solutions to one or more of the problems described above. For example, one embodiment enables the open-ended sharing of managed objects in a cloud-based file sharing system by enabling the use of workflows within the file sharing system. In this system, a user who is authorized to access managed objects can create a workflow that is associated with the managed objects, and can associate one or more tasks and users with the managed objects, thereby giving the associated users authorization to access the managed objects for the performance of the associated tasks. For instance, an authorized enterprise user may create a workflow associated with a document, where the workflow identifies a task such as reviewing and editing the document. The authorized enterprise user may assign this task to an external user, giving the external user authorization to perform the task (i.e., review and edit the document). The enterprise user may be required to have a predetermined level of authorization to assign the task to the external user, or the external user's access to the managed object may otherwise be limited or constrained by the level of authorization held by the enterprise user. When the task is complete, the authorization may be automatically revoked, so that the external user no longer has access to the document. It is not necessary to copy the managed object to another location, allocate the external user in the system, or to otherwise separately authorize the user to access the document.

In another embodiment, a cloud-based file sharing system may provide templates for creating workflows which enable the sharing of managed objects. In this embodiment, one or more reusable workflow templates are stored by the system. Each template may be stored as an object that defines one or more components of the workflow, or placeholders for these components. A template may, for example, include placeholders for one or more managed objects, one or more tasks to be performed with respect to the managed objects, and one or more users who are assigned to perform the tasks. An authorized user may select one of the workflow templates from a list of available templates, such as in a drop-down menu, to create a workflow instance. The authorized user may then identify specific managed objects, tasks and users associated with the created workflow instance.

One embodiment comprises a method for enabling use of workflows in a multitenant environment. The method includes executing a multitenant content sharing system in a cloud-based environment and storing plurality of content objects in a data repository of the system, where the content objects are owned by one or more tenants, and the content objects are encrypted with keys of respective tenant-owners. Each tenant configures a set of tenant access rules for content objects owned by that tenant, where the system enables users associated with the tenant to access content objects owned by the tenant according to the tenant access rules. The multitenant content sharing system enables a first user to initiate a workflow instance, associate a content object with the workflow instance, where the first user is authorized by a tenant-owner of the content object to access the content object, and associate a second user with the content object via the workflow instance. The multitenant content sharing system then enables the second user to access the content object according to the workflow instance.

In one embodiment, the second user is not associated with the tenant-owner of the content object, and the multitenant content sharing system may enable ad hoc authorization of the second user to access the content object without prior system-level authorization of the second user. The multitenant content sharing system may store one or more workflow templates, where the system enables the first user to instantiate the workflow as an instance of one of the workflow templates. The workflow templates may be template objects that are stored in the data repository, where each template object includes one or more task attributes, content object attributes and/or associated user attributes, and each instance of a workflow template may contain metadata defining one or more tasks, content objects and associated users. The metadata may include placeholder objects, and may include an indicator for each content object that indicates whether the content object is a working document or a reference document, wherein the system enables the second user to edit content objects that are working documents, and prevents the second user from editing content objects that are reference documents. The multitenant content sharing system may enable the second user to access content objects by decrypting the content objects using a decryption key of a tenant-owner of the content objects. The system may enable the first user to associate content objects with a workflow instance by determining whether the first user is authorized to access the content object according to the tenant access rules of the tenant-owner of the content object, enabling the first user to associate the content object with the workflow instance if the first user is authorized to access the content object, and preventing the first user from associating the content object with the workflow instance if the first user is not authorized to access the content object.

Embodiments of the invention may improve EIM systems by providing a safe and secure way to expose content and collaborate with external participants on enterprise-managed content through the use of structured workflows in a multitenant cloud-based file-sharing storage system. Embodiments of the invention may therefore provide a number of technical advantages over the prior art. For instance, embodiments may eliminate the need for the filesharing system to allocate an external user so that the external user can access the collaboration objects. Embodiments may further eliminate the need for external users to download and install specific applications that were previously necessary in some cases to access collaboration objects. Embodiments may further eliminate the need to access collaboration objects through a virtual private network (VPN) or secure on-prem backend server. Embodiments may further eliminate the need for an enterprise administrator to configure access permissions to enable an external user to access collaboration objects. Embodiments may further eliminate the need to reconfigure access permissions or otherwise revoke authorization for external users to access collaboration objects when the collaboration is completed.

One alternative embodiment comprises a system having a processor and a non-transitory computer-readable storage medium that stores computer instructions executable by the processor to perform a method substantially as described herein. Another embodiment comprises a computer program product having a non-transitory computer-readable storage medium that stores computer instructions executable by a processor to perform a method substantially as described herein. Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

FIGS. 7A-7E depict screenshots illustrating the creation of a workflow instance according to some embodiments disclosed herein.

DETAILED DESCRIPTION

Figure 1:
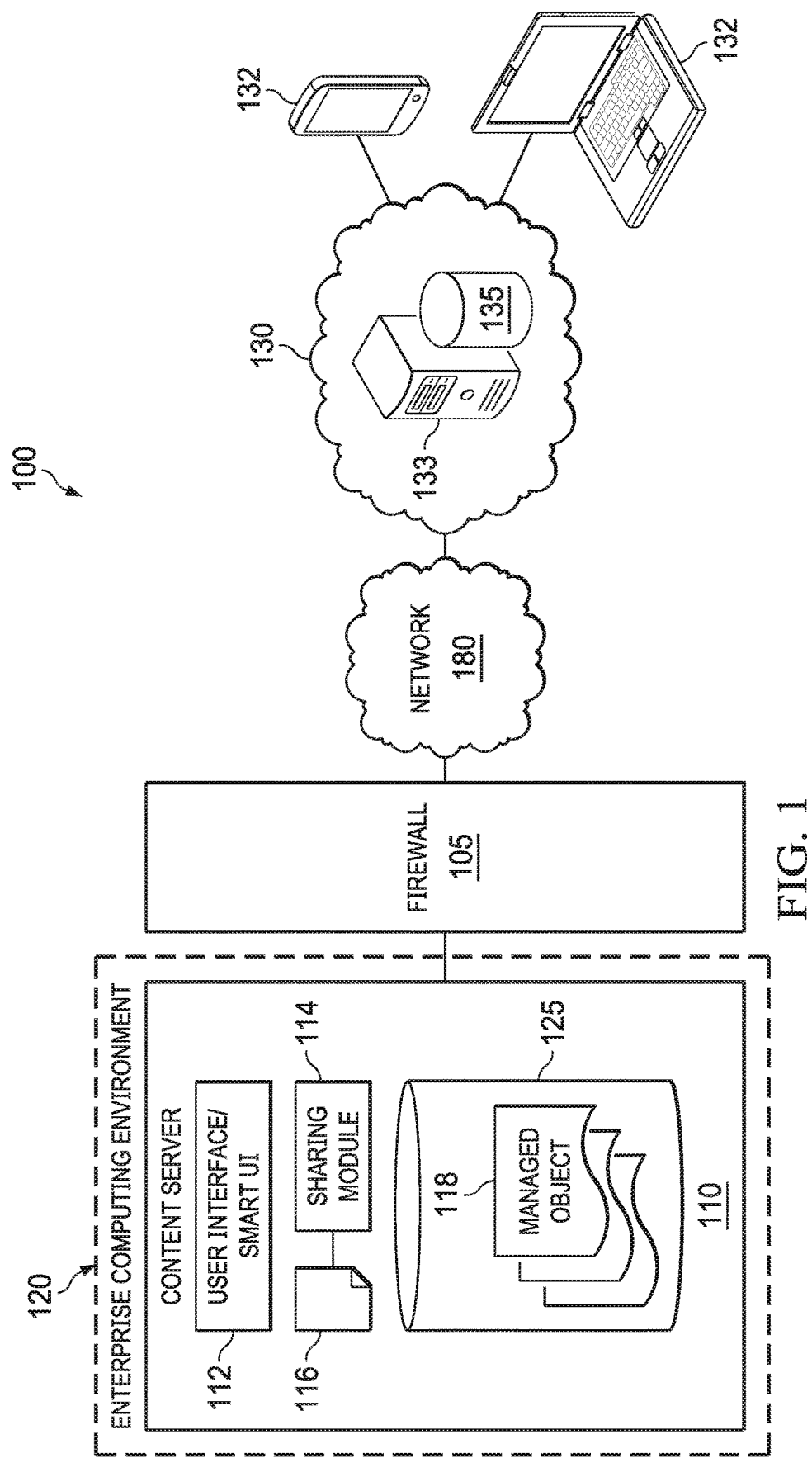
FIG. 1 depicts a diagrammatical representation of a system for sharing repository content managed by a content server in an enterprise computing environment through external systems according to some embodiments disclosed herein.

The invention and the various features and advantageous details thereof are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions, and/or rearrangements within the spirit and/or scope of the underlying inventive concept will become apparent to those skilled in the art from this disclosure.

A goal of this disclosure is to describe a file sharing platform operating external to an enterprise computing environment, where users can safely and securely share and collaborate on objects (e.g., documents) in a content repository of the file sharing platform. The platform may, for example, use workflows instantiated from reusable templates to enable open-ended sharing of objects with external users while avoiding a number of problems found in the prior art, such as requiring the external users to download and install applications to access the objects, requiring that the external users access the objects through a VPN or a secure on-premise backend server, requiring that the external users separately obtain credentials to access the objects, requiring that the external users learn to use the file sharing platform, requiring that administrators configure access permissions to allow the external users to access the objects, etc.

In some embodiments, these and other goals can be realized in a file sharing platform enhanced with several components to provide a new workflow function that may make use of reusable templates to instantiate workflow instances, thereby enabling access and collaboration on tasks involving objects maintained on the file sharing platform. This may include, for example, providing new and/or updated file sharing platform components such as an enhanced user interface (UI). In this disclosure, the term "platform" broadly refers to a particular structure on which one or more software products (i.e., applications) can be built within the same technical framework. The structure, in this case, may include both hardware and software components.

An exemplary content suite that includes a content server provides a non-limiting example of a content server platform on which some embodiments disclosed herein can be implemented. An example of an external system (i.e., a system that is external to an EIM system or content server operating in an enterprise computing environment) is referred to herein as the core system (or simply "core"). The core system operates in a cloud computing environment and provides personal cloud storage for securely sharing and collaborating on files. These files are stored by core in the cloud computing environment (e.g., on a server computer in a multitenancy platform operated by a cloud-hosting service provider) which is separate and independent from the enterprise computing environment. Skilled artisans appreciate that embodiments disclosed herein are not limited to core and can work well with any external systems, including any third-party cloud storage system operating in a cloud computing environment external to an EIM system operating behind a firewall of an enterprise computing environment.

Sharing content managed by a content server through an external system was previously achieved by the content server in ways such as sharing through a public link, sharing through an email invite, or sharing through shared workspaces. In the present embodiments, content is shared through the use of structured workflows that may be instantiated from templates that are provided by the external file sharing system. The workflows can be configured to associate files, tasks and users for the purpose of achieving desired workflow results (e.g., review, editing and approval of documents). Users who are assigned to perform specific tasks within a workflow are authorized through the workflow to access the files associated with the tasks. For instance, if an external user is assigned a workflow task to edit a document, the external user is authorized to access the document so that the document can be edited by the external user, even if the external user did not previously have authorization to access the document. This may be referred to herein as ad hoc authorization of the external user. The authorization of the external user may be limited by the access rights of the user originating or configuring the workflow (i.e., the originating user must have sufficient rights to the document to delegate access permission to the external user). The authorization of the external user may be limited in time (e.g., the access must be completed by a specified deadline), scope (e.g., the external user may be authorized to read, but not edit a document), or in other aspects.

In some embodiments, to share a managed object (e.g., a document or folder), an enterprise user, who may be referred to herein as an "originator," first logs into a content server. The originator can navigate to the managed object, which is stored in a repository managed by the content server, through a user interface provided by the content server. The originator can indicate to the content server (e.g., through actuation of a user interface element such as a box or button associated with the managed object) that the managed object is to be shared.

In some embodiments, the content server is configured for communicating with an external file sharing system over a network (e.g., through a public application programming interface (API) provided by the external system). Responsive to the originator's instruction to share the managed object, the content server is operable to make a copy of the managed object, send the managed object to the external file sharing system. The managed object stored in the repository is locked (e.g., by marking it as "read-only") when the copy is provided to the external file sharing system.

In some embodiments, the external file sharing system comprises a cloud-based multitenant system. Since there is a need to secure access to the managed objects and to prevent tenants from accessing other tenants' managed objects without authorization, the managed objects may be encrypted. An administrator for each tenant may configure access permissions for the tenant's managed objects in order to enable access by users (typically those associated with the tenant) to the managed objects. In some instances, it may be desirable for the tenant to share its managed objects with external users who are not authorized to access the files (e.g., not part of enterprise, not subscribed to file sharing system, or not otherwise authenticated). Workflow functionality is provided in the present embodiments to facilitate sharing and collaboration relating to managed objects without necessitating that a tenant administrator configure access permissions in each instance. This is accomplished in the present embodiments by building structure around collaboration using workflow instances that may be instantiated from reusable templates. An instantiated workflow may associate tasks and users with managed objects and may enable access by the users to the managed objects consistent with the assignment of tasks by a user who has authorization to access the managed objects.

FIG. 1 is a diagrammatical representation of a system 100 for sharing content that is stored in a repository in an enterprise computing environment. In this example, a content server 110 resides within an enterprise computing environment 120 behind a firewall 105. Content server 110 includes a repository 125 that stores a set of managed objects 118. Content server 110 also includes a sharing module 114, a tracking mechanism 116 (e.g., a tracking database), a user interface (UI) 112 such as an enhanced or smart UI, and various other components. The operations and functionalities of these content server components are further described below.

Skilled artisans appreciate that a content server can be located "on-prem" in an enterprise computing environment or hosted in a cloud computing environment. Likewise, a system external to the content server can be an on-prem external system or a cloud-hosted external system. Accordingly, FIG. 1 is meant to be exemplary and non-limiting. In the example of FIG. 1, external system 130 represents a cloud-hosted external system that is connected via network 180 to the enterprise computing environment. External system 130 can have server machine(s) 133 with storage device(s) 135 that are accessible by user devices 132.

As discussed above, in some cases, an enterprise user may need to collaborate and/or share files with external users. For example, a content server user "Engineer" may try to create a design specification for a new pump that will be delivered to a customer. The pump specification document is stored in the content server. However, Engineer needs some input from external contractors who will be supplying parts to the pump. Those contractors do not have access to Engineer's document in the content server, but Engineer needs them to be able to edit and make changes to the pump specification document. Since external contractors are not part of the enterprise, Engineer may make a copy of the pump specification document and upload the copy to the external file sharing platform in order to make the document available to the external contractors.

Once the pump specification document is shared outside of the enterprise network, it is no longer under management by the content server. If each of the contractors (external users) is given free access to view, modify, copy, store (e.g., in hosted or local storage), and even share the document with other external users, the content server may have no way of tracking the shared copy, getting the shared copy back to the content server, and/or updating the original file to reflect any changes made to the shared copy. This kind of "copy-and-set-free sharing" can pose a security risk. Consequently, the sharing features may be disabled, or other security measures may be implemented to prevent sharing certain files, folders, directories, etc. In a multitenant file sharing system, the managed objects that are copied to the system may be encrypted so that each tenant can only decrypt its own managed objects and share those objects as desired.

In some embodiments, access to sharing features provided by the file sharing system is turned off by default. An administrator for an enterprise can, however, enable sharing and assign sharing privileges to designated users through an administrator UI. Following the above example, an administrator could configure access permissions to allow Engineer to share the pump specification document stored on the file sharing system with the contractors. Once shared, the contractors can edit the copy stored on the file sharing system. When the contractors have made their inputs to the copy stored on the file sharing system, Engineer can retrieve the edited copy of the document to the enterprise content server.

Figure 2:
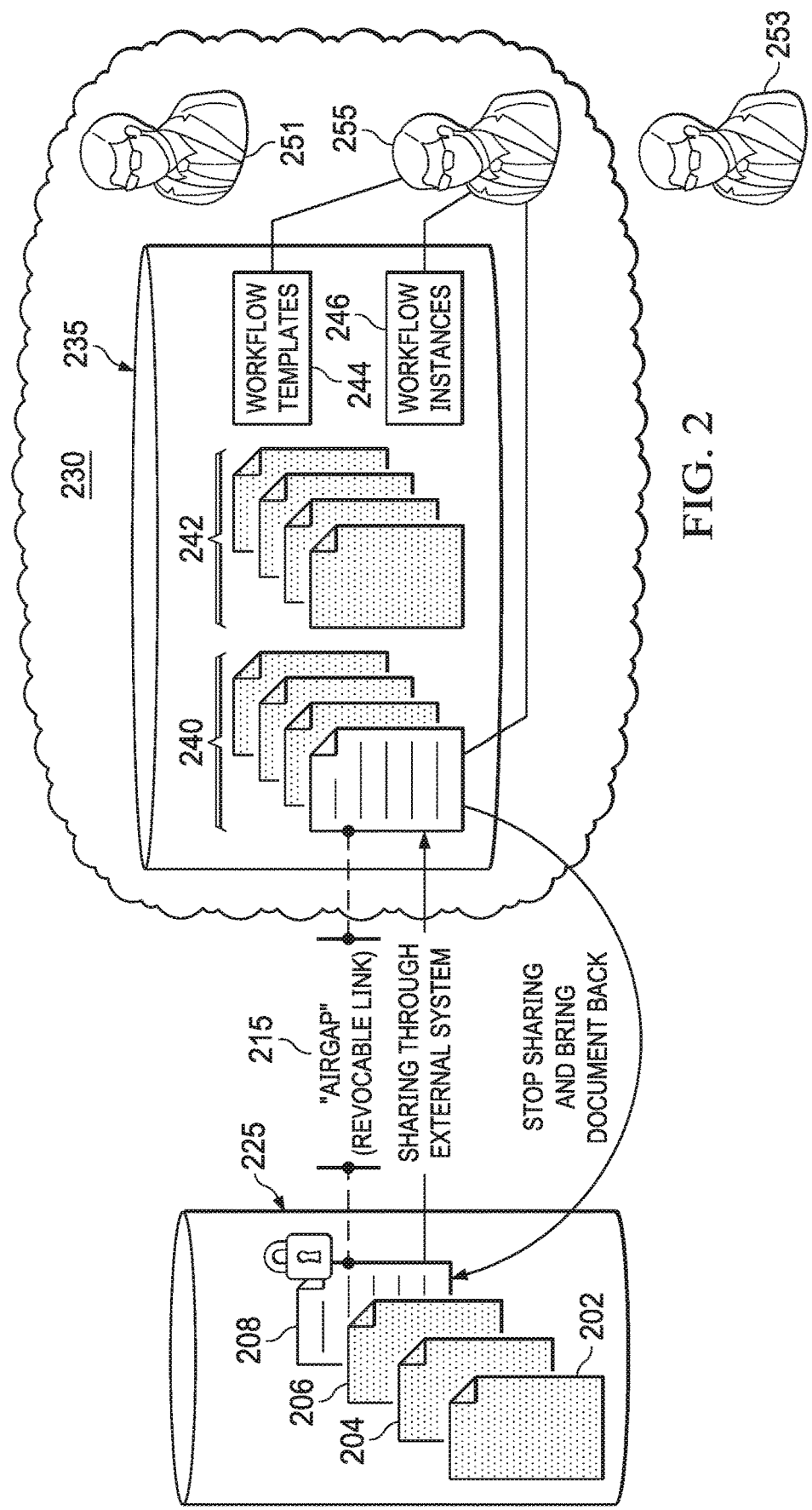
FIG. 2 depicts a diagrammatical representation of a data flow when repository content managed by a content server in an enterprise computing environment is shared through an external system and retrievable by the content server through a revocable link according to some embodiments disclosed herein.

FIG. 2 is a diagrammatical representation of a data flow when repository content managed by a content server in an enterprise computing environment is shared through an external file sharing system and retrievable by the content server through a revocable link according to some embodiments disclosed herein. In this example, repository 225 of a content server in an enterprise environment stores managed objects such as documents 202, 204, 206, 208. Using a content server UI, an enterprise user (who may be referred to herein as the "originator") can select a document (e.g., document 208) which is stored in repository 225 to share the document through external file sharing system 230.

In the example of FIG. 2, a copy (e.g., document 208-C) of the document (e.g., document 208) selected by the originator (through a UI element on the content server UI) for external sharing is made and sent to the external system (e.g., external file sharing system 230). The external system stores the copy in its local storage (e.g., repository 235). The external system may notify participants that the originator has shared the copy with them. The external system may also notify all participants when a new document version has been added (by any of the participants). Further, the external system may notify all participants when something changes in the document share.

In some embodiments, the external system may return to the content server a unique identifier generated by the external system to identify the copy internally. The content server is operable to store this unique identifier from the external system along with its document identifier for the original document in a tracking table or database (e.g., tracking table 116). The original document stored in the repository managed by the content server and the copy stored on the external system (also referred to as a "document share") is linked through this relatively weak and revocable link (e.g., link 215) referred to as an airgap.

The original document (e.g., document 208) may be marked and tagged, for instance, as "shared for collaboration" in the content server's repository (e.g., repository 225). This tag can help identify and track documents that have been shared. In some embodiments, audit logs can be created with share-related information. The content server UI is updated to reflect or otherwise indicate that the document (or folder) is shared externally. The originator can choose to "unshare" the document share through the content server UI. In some embodiments, unsharing a file share may cause the content server to retrieve the last version from the external system and add it as a new version in the repository managed by the content server. In turn, the external system sends notifications to all participants that the file share has been revoked and removes the file share from its storage.

In one embodiment, file sharing system 230 is a cloud-based multitenant system. Repository 235 is therefore configured to store managed objects for multiple tenants. Documents 240, for instance, may be owned by a first tenant (e.g., the enterprise associated with repository 225), while documents 242 may be owned by a different tenant. In order to prevent one tenant from accessing the documents of other tenants without authorization, the documents may be encrypted with keys that are controlled by the owners of the response documents. Thus, for example, the enterprise associated with repository 225 may have a key that decrypts documents 240, so an administrator of the content server for this enterprise may decrypt and authorize access to documents 240, but not documents 242.

In the example of FIG. 2, an enterprise user 255 is authorized by an administrator of the enterprise associated with repository 225 to access document 208-C. This user may be an internal user of the content server, such as the originator 255 or another user 251 associated with the enterprise, or an external user 253. User 255 may have authorization to access only document 208-C, or other documents within the set of documents 240 owned by the enterprise and stored on file sharing system 230. User 255 does not have access to documents 242 that are not associated with the enterprise, unless an administrator associated with the owner(s) of those documents grants authorization to user 255.

In this instance, user 255 also has access to reusable workflow templates 244 that are stored in repository 235. Templates 244 provide some structure that allows the user to define workflows relating to documents (e.g., document 208-C) stored by the file sharing system. The templates may be configured to provide structure for common workflows, such as reviewing, editing and/or approving documents. Access to workflow templates 244 may require a subscription to this service on the file sharing system, authorization by an administrator of the enterprise, or other authorization to access the templates. An authorized user can instantiate workflow instances from templates 244, and the instantiated workflow instances 246 may be stored in repository 235. The instantiating or originating user (user 255 in this case) has access to the workflow instances and configures the workflow instances, defining their attributes, such as related documents, tasks, instructions, timelines, users, etc. This attribute information, along with state information associated with the workflows, tasks and documents is stored in repository 235.

Figure 3A:
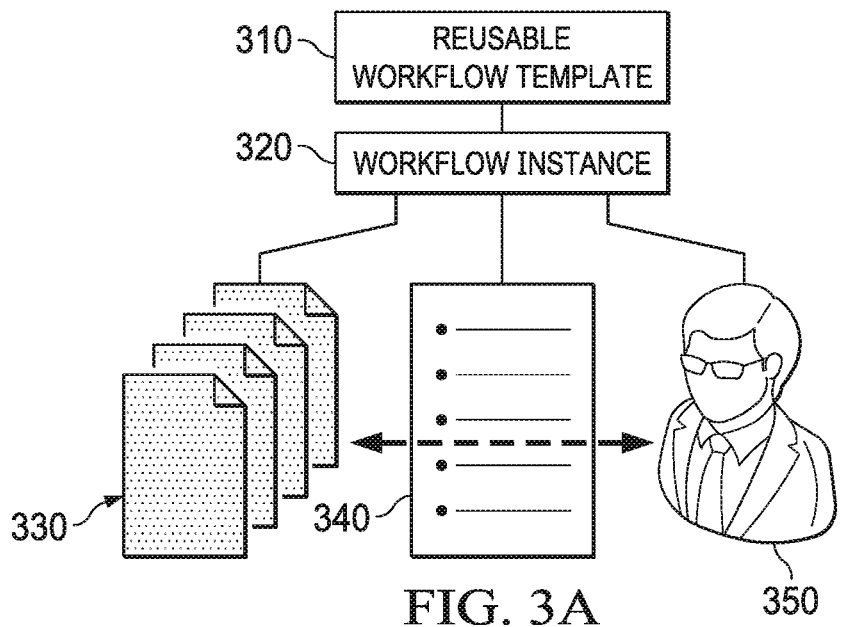
FIGS. 3A-3B are diagrammatical representations of the relationship between workflow templates, workflow instances, documents, tasks and users according to some embodiments disclosed herein.

Referring to FIG. 3A, a diagrammatical representation of the relationship between workflow templates, workflow instances, documents, tasks and users according to some embodiments is shown. In this example, a reusable workflow template 310 is provided to an authorized user by the file sharing system. Template 310 may be one of a series of templates, each of which corresponds to a different type of workflow. The authorized user selects the workflow template and instantiates a particular workflow instance based on this template. The workflow instance is stored in a workflow instance data structure in the repository of the filesharing system. The workflow instance initially includes placeholders for different attributes of the workflow, such as documents related to the workflow instance, tasks that are part of the workflow instance, and users assigned to perform the tasks of the workflow instance. After workflow instance 320 has been instantiated, the instantiating user configures the workflow instance by entering attribute information that identifies specific documents 330, tasks 340 and users 350 to replace the original placeholder components of the workflow. The instantiating user may also specify additional attribute information associated with the workflow, such as timelines or dates associated with the tasks, comments or instructions associated with the tasks, etc. The attributes entered by the user to define the specific workflow instance are stored as metadata for the workflow instance in the workflow instance data structure in the file sharing system repository.

The attribute information entered by the instantiating user to configure the workflow instance associates the different components of the workflow instance with each other. For instance, referring to the example of reviewing a pump specification document given above, Engineer (the instantiating user) may identify the pump specification document stored in the repository of the filesharing system, and may indicate that the specification document is to be reviewed and edited (the tasks) by specific contractors (the users). Thus, the tasks of reviewing and editing are associated with the pump specification document, and the contractors who are assigned to these tasks are associated with the tasks, as well as the pump specification document.

In one embodiment, the assignment of the contractors to the task of reviewing and editing the specification document serves as a delegation of the instantiating user's authority to access the document. As a result, the contractors are allowed by the filesharing system to access the pump specification document, even if they did not have authorization to access the document prior to instantiation and configuration of the workflow instance. This facilitates the workflow defined by the workflow instance and avoids the need in prior art systems to separately authorize the contractors' access to the document, which may have included: registering the users with the filesharing system; requiring an administrator of the enterprise content server to authorize access to the document; requiring the contractors to download specialized applications for accessing the document; requiring the contractors to access the document via a virtual private network (VPN), and so on. It should be noted that the user that instantiates the workflow instance can only assign access to the document consistent with the user's own access permissions, so the users that are assigned tasks in the workflow instance can have no greater access to the documents associated with the tasks than the instantiating user.

Figure 3B:
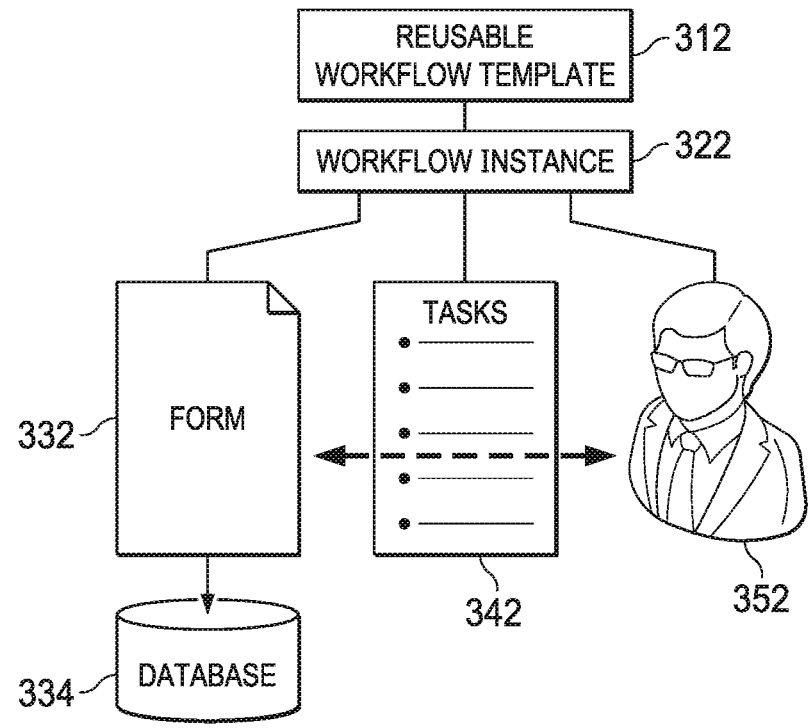

Referring to FIG. 3B, a diagrammatical representation of the relationship between workflow templates, workflow instances, forms, tasks and users according to some embodiments is shown. In this example, a reusable workflow template 312 is provided to an authorized user by the file sharing system. Template 312 provides the structure for a workflow that involves entering data into a database 334 through a form 332. An authorized user selects workflow template 312 and instantiates a workflow instance 322 based on this template. The workflow instance is stored in a corresponding data structure in a repository of the filesharing system. The structure of the workflow instance in this example provides for a form, tasks associated with the form (e.g., entering data in the form), and assignees who will perform the tasks.

After workflow instance 322 has been instantiated, the instantiating user configures the workflow instance by identifying a specific form 332 that will be used to enter data. The data will not be retained in the form itself, as when a user edits a document to add information to the document, but will instead serve as a conduit for addition of the data to a native content object, such as a database 334. As in the previous example, the instantiating user may specify additional attribute information associated with the workflow, such as timelines or dates associated with the tasks, comments or instructions associated with the tasks, etc. The attributes provided by the instantiating user are stored as metadata in the workflow instance data structure which is stored in the file sharing system repository.

As explained above, the attribute information provided by the instantiating user to configure the workflow instance associates the different components of the workflow instance with each other. In this case, the assignee user 352 is associated with the task 342, which is associated with the form 332. Form 332 may be defined as being associated with a particular native object, or it may be configurable so that the instantiating user can, when the workflow instance is being configured, identify a native object with which it will be associated for the purposes of the workflow instance.

The assignment of the user to the task of entering data in the form serves as a delegation of the instantiating user's authority to access the document. Consequently, the assignee-user allowed by the filesharing system to access the database without the need to have authorization to access the database prior to configuration of the workflow instance. In one embodiment, the access to the native object via the form may be limited to adding data to the native object. For instance, the assignee-user may have authorization (through the workflow instance) to enter data in the form and thereby add data to the database, but the assignee-user may not be able to read data from the database or change any of the data that is already in the database. The level of access to the native object may vary in other embodiments. Regardless, the ability to provide delegated authorization to access the native object through the configuration of the workflow instance may avoids the problems encountered in the prior art with respect to authorizing the user's access to the object.

Figure 4:
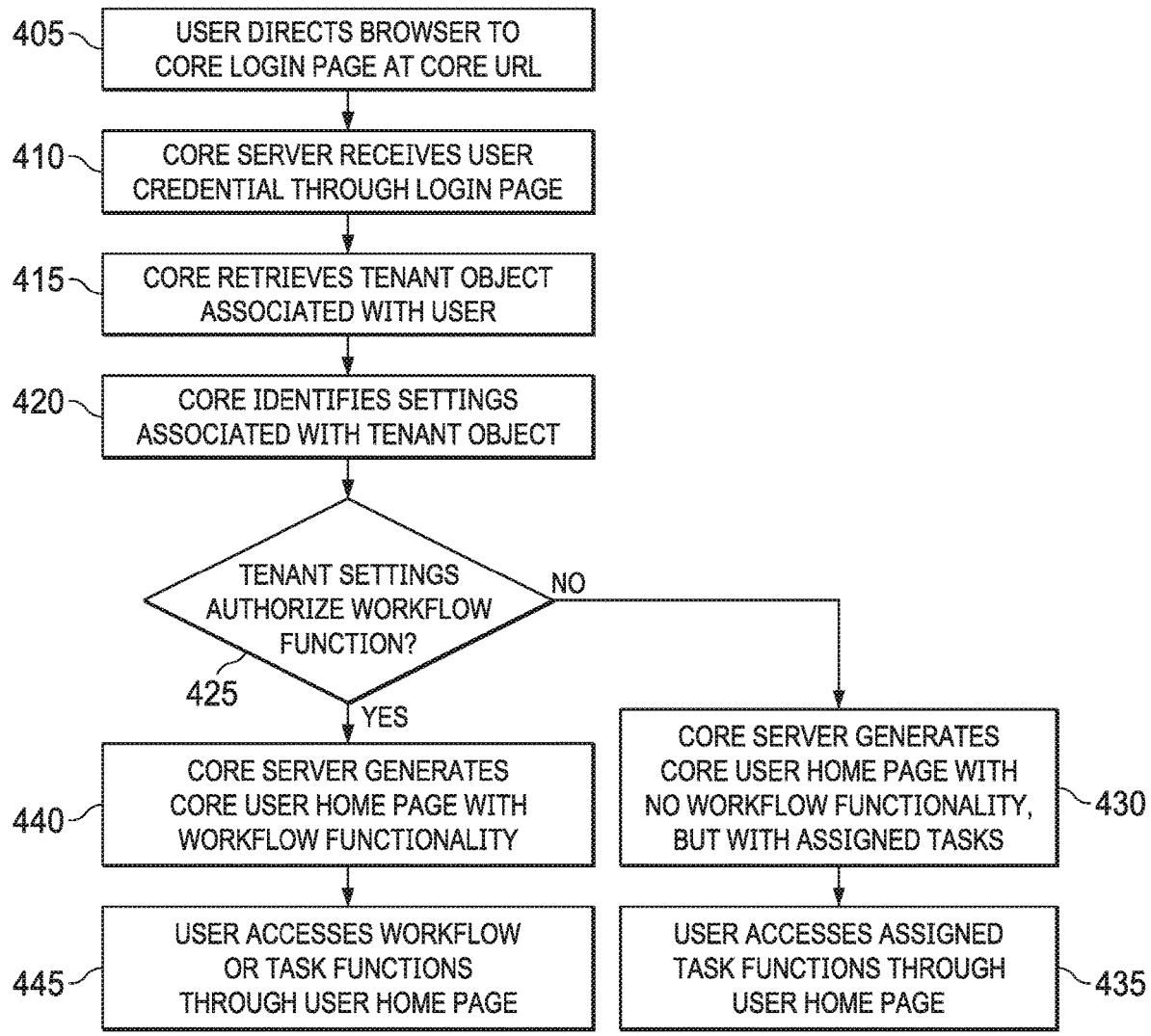
FIG. 4 depicts a flow diagram illustrating a method for accessing workflow functions in a cloud-based multitenant filesharing system according to some embodiments disclosed herein.

Referring to FIG. 4, a flow diagram illustrating a method for accessing workflow functions in a cloud-based multi-tenant filesharing system in accordance with one embodiment is shown. In this embodiment, a user first directs a browser to a login page of a file sharing system such as core (405). The core server receives the user's credentials that are provided through the login page (410) and verifies the credentials. Assuming the user's credentials are verified, the core server identifies a tenant object (415) corresponding to the tenant that is associated with the user (i.e., the enterprise with which the user is associated). The core server then identifies the settings that are associated with the retrieved tenant object and determines whether the settings indicate that workflow functionality is available to the tenant (420). In one embodiment, the tenant settings will identify a license level of the tenant, and the availability of workflow functions to the tenant or a subset of the tenant's users will be based upon the license level. If, at 425, workflow functions are not available to the tenant, the core server will generate a homepage for the user that does not enable workflow functionality (i.e., the user cannot select or create workflow instances), but may include specific workflow tasks if any such tasks have been assigned to the user (430). If any such workflow tasks have been assigned to the user and these tasks remain pending, the user may access the tasks through the user homepage so that the associated tasks can be performed (435). If, at 425, workflow functions are available to the tenant, hence to the enterprise user who is associated with the tenant, the core server will generate a homepage for the user that includes workflow and task functionality (440). The user may then access the workflow functions or task functions via the homepage (445).

Figure 5:
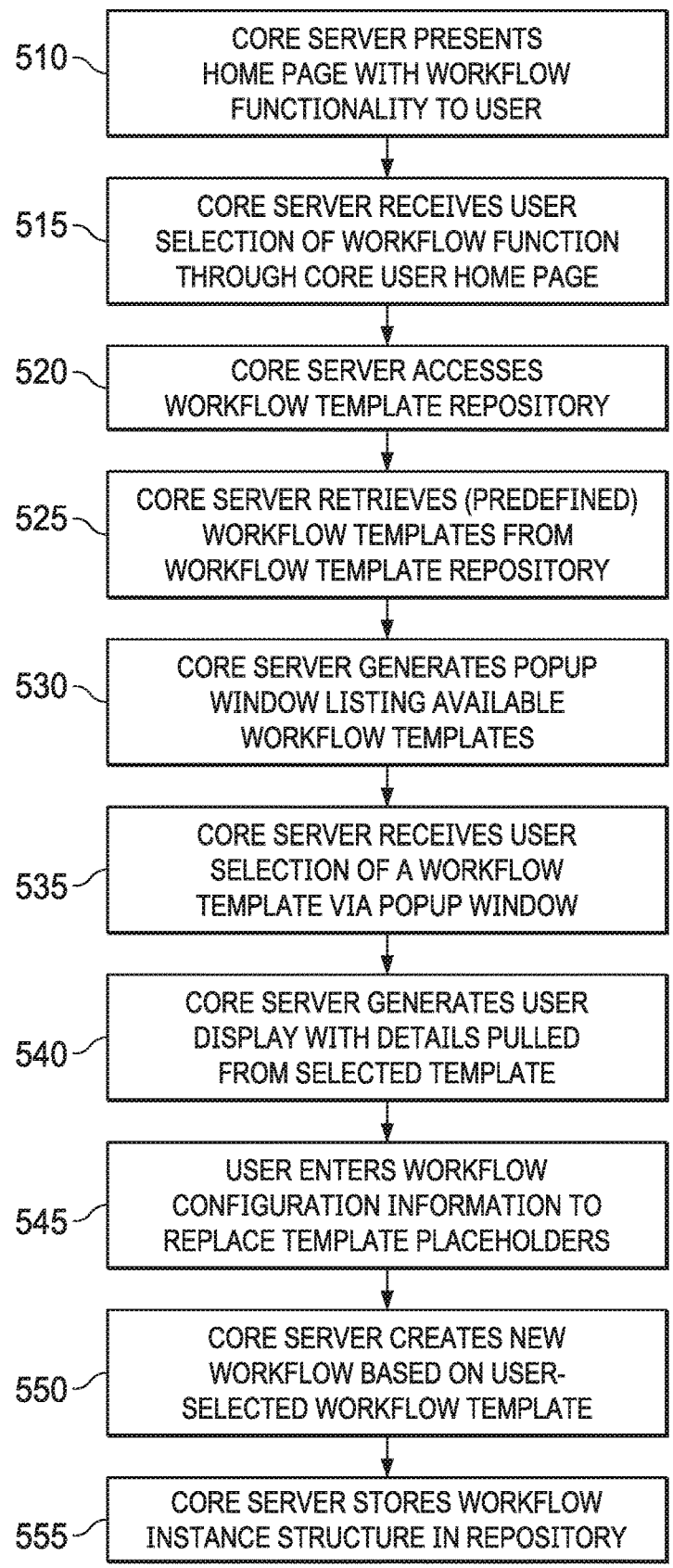
FIG. 5 is a flow diagram illustrating a method for creating and storing a workflow instance according to some embodiments disclosed herein.

Referring to FIG. 5, a flow diagram illustrating a method for creating and storing a workflow instance in accordance with one embodiment is shown. In this embodiment, a user that has access to workflow functionality is presented with a user homepage that includes a workflow link or button (510). The user uses this link to select the workflow functionality, which selection is received by the core server through the homepage (515). Responsive to the user's selection of the workflow functionality, the core server accesses the workflow templates that are available in the system's repository (520), retrieves a list of the available templates (525) and generates a pop-up window on the user's homepage that lists the available templates (530). The user then selects one of the available templates and this selection is provided to the core server (535). The core server then retrieves the workflow structure defined by the selected template and generates a user display that includes details pulled from the selected template (540). These details may include, for example, placeholders for documents, tasks and users who are assigned to perform the tasks. The user then enters workflow configuration information in the structure defined by the template (545), which may include replacing placeholder components with specifically identified files, tasks or users, entering instructions for the performance of specific tasks, setting due dates for tasks, or providing other information relevant to the workflow. After the user has entered information associated with the workflow, the core server generates a new workflow instance that includes the entered information within the structure provided by the selected template (550). The system may also generate additional metadata that is associated with the workflow instance, such as the time at which the workflow instance was created, the user who created it, and so on. The core server then stores the generated workflow instance in the system's repository (555).

The reusable workflow templates and the workflow instances that are instantiated from the templates may be stored in the repository in any suitable data structure. In one embodiment, a workflow instance is structured as an HTTP POST call. Portions of an exemplary POST call is shown below to illustrate a suitable structure. It should be noted that the included portions of the POST call are intended to be illustrative of the information that is included in the workflow instance data structure, and the specific implementation of the data structure may vary from one embodiment to another.

The reusable workflow template includes much of the structure that is included in the workflow instance. As the user configures a workflow instance, information is added in the workflow instance data structure to capture the configuration. This information may include specific file identifiers, due dates, assignees, etc. After the workflow instance has been configured by the user, the system automatically updates the state of the workflow instance, as well as the state of each task in the workflow instance. The identified states that are possible for each task may depend on the type of the task.

As shown in the portion of the POST call below, each workflow instance has a unique identifier ("id"), as well as a name (which in this example defaults to the name of the template from which it was created, although it can be changed by the user). In this example, the times at which the workflow instance are created and updated, as well as the users who created and updated the instance are stored. The workflow supervisor, who is typically the originating user, and the template from which the instance was created are also identified in the data structure. Email addresses for the different users (e.g., the originating user and the assignees of the tasks) may be included in the workflow instance so that notifications of assignments, task status, etc. may be sent to the respective users. The users with permission to execute the workflow instance are also identified. The data structure for the workflow instance identifies the current state of the workflow instance ("running", in this example), as well as the due date for the workflow instance.

```
{
    "id" : "2ux6uWxuKSTcLVjnygyMCA",
    "createTime" : "2019-01-23T20:29:39Z",
    "updateTime" : "2019-01-23T20:29:39Z",
    "createdBy" : {...},
    "updatedBy" : {...},
    "workflowSupervisor" : {...},
    "name" : "Collect Files for Review, Edit and Approval",
    "state" : "running",
    "dueDate" : "2019-02-05T04:59:59Z",
    "processTemplateId" : "71G4CV2kPCXieMBroAjhma",
    ...
    "executepermits" : [ "OWNER", "ALL_USERS_IN_TENANT" ],
...
```

The workflow instance data structure further includes information that defines the tasks included in the instance as shown in the following portion of the POST call. In this portion of the call, the overall instructions for the workflow instance are provided, and the individual tasks are defined. The data structure first identifies the different activities within the workflow instance ("Submit Files", "Review Files", "Edit Files", "Approve Files"), and defines the specific tasks in each activity. Each activity has an identifier (e.g., "activity_1", "activity_2", etc.), name (e.g., "Submit documents", "Review Files", etc.), instructions (e.g., "Submit documents", "Review the posted documents", etc.). The tasks may likewise have unique identifiers, creation and update times and associated users, names, instructions, due dates, assignees (users assigned to perform the tasks), permissions, states, and the like.

```
...
    "processDefinition" : {
        "instructions" : "Workflow template to collect documents
        for review, edit and
approval",
        "startActivities" : [ "activity_1" ],
        "activities" : [ {
            "id" : "activity_1",
            "name" : "Submit Files",
            "instructions" : "Submit documents",
            "type" : "manual",
            "subType" : "submit",
            "configuration" : {
                "executionType" : "anyUser"
            },
...
```

Figure 6:
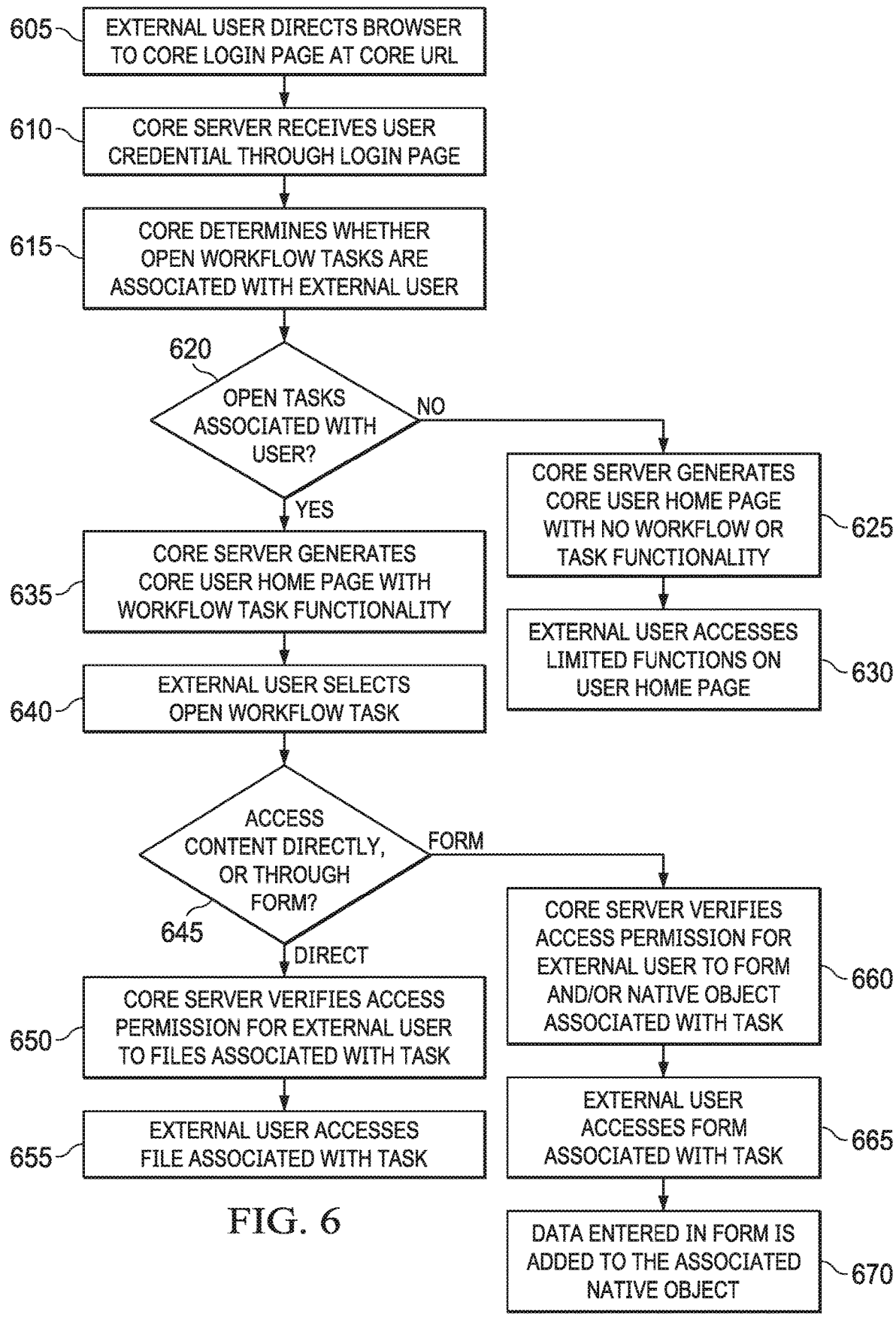
FIG. 6 is a flow diagram illustrating a method for accessing workflow tasks by an external user according to some embodiments disclosed herein.

Referring to FIG. 6, a flow diagram illustrating a method for accessing workflow tasks by an external user in accordance with one embodiment is shown. In this example, it is assumed that the external user is not associated with a tenant of the filesharing system that has access to workflow functionality. In other scenarios, the external user may be associated with a tenant of the filesharing system. This tenant may, or may not, have access to workflow functionality, depending upon the license level of the tenant. If the tenant does not have access to workflow functionality, associated users may nevertheless access workflow tasks as described below in connection with FIG. 6 if the users have been assigned to these tasks by a user that has access to workflow functionality. If the tenant associated with the user does have access to workflow functionality, the process of accessing workflow tasks assigned by a user associated with a different tenant may also proceed essentially as described in connection with FIG. 6, as the workflows of each tenant may be secured and protected from access by other tenants in the same manner as the managed objects that are securely stored by the filesharing system.

In accordance with FIG. 6, the external user first directs a browser to a login page at the core URL (605). The user logs in and the core server receives the user credential through the login page (610). Based upon the external users credential, the core server determines whether there are open (pending) workflow tasks that are associated with the user (615). If there are no open tasks that are associated with the external user (620), the core server generates a user homepage for the external user that does not include workflow or task functionality, or does not enable it (625). The external user may then have access to limited functions other than workflow functionality, if any, that may be available on the user homepage (630). If there are open workflow tasks that are associated with the external user (620), the core server generates a user homepage that includes workflow task functionality (635). The external user may then select one of the open workflow tasks in order to perform the task (640).

As noted above, the open workflow task may be associated with a particular file or other content object that is intended to be directly accessed by the user to perform the assigned task (e.g., reviewing or editing a document), or the task may be associated with a form that allows the user to indirectly access a native content object. If the task is associated with a content object that will be directly accessed (645), in response to the user selecting the task, the core server verifies the external user's access permission for the content object(s) associated with the tasks as defined by the workflow configuration (650). If the user is authorized to access the content object, the core server then enables access by the external user to content object (655).

If the workflow instance identifies a form that is associated with a native content object, and the native content object will be accessed through the form (e.g., data will be added to the native object via the form) (645), the core server will verify the external user's access permission (660). This may include verifying access permission for the form or the native content object individually, in which case permission to access one may imply permission to access the other. Alternatively, the core server may verify the external user's access permission to both the form and the native content object. After the external user's permission to access the form and/or the native object have been verified, the user accesses the form to enter data in the defined form fields (665). The data entered by the user in the form is then added to the native content object (670). In one embodiment, even though the user is allowed to enter data into the native content object through the form, the user is not allowed to view or edit data in the native content object.

Referring to FIGS. 7A-7E, a set of screenshots illustrating the creation of a workflow instance in accordance with one embodiment is shown.

Figure 7A:
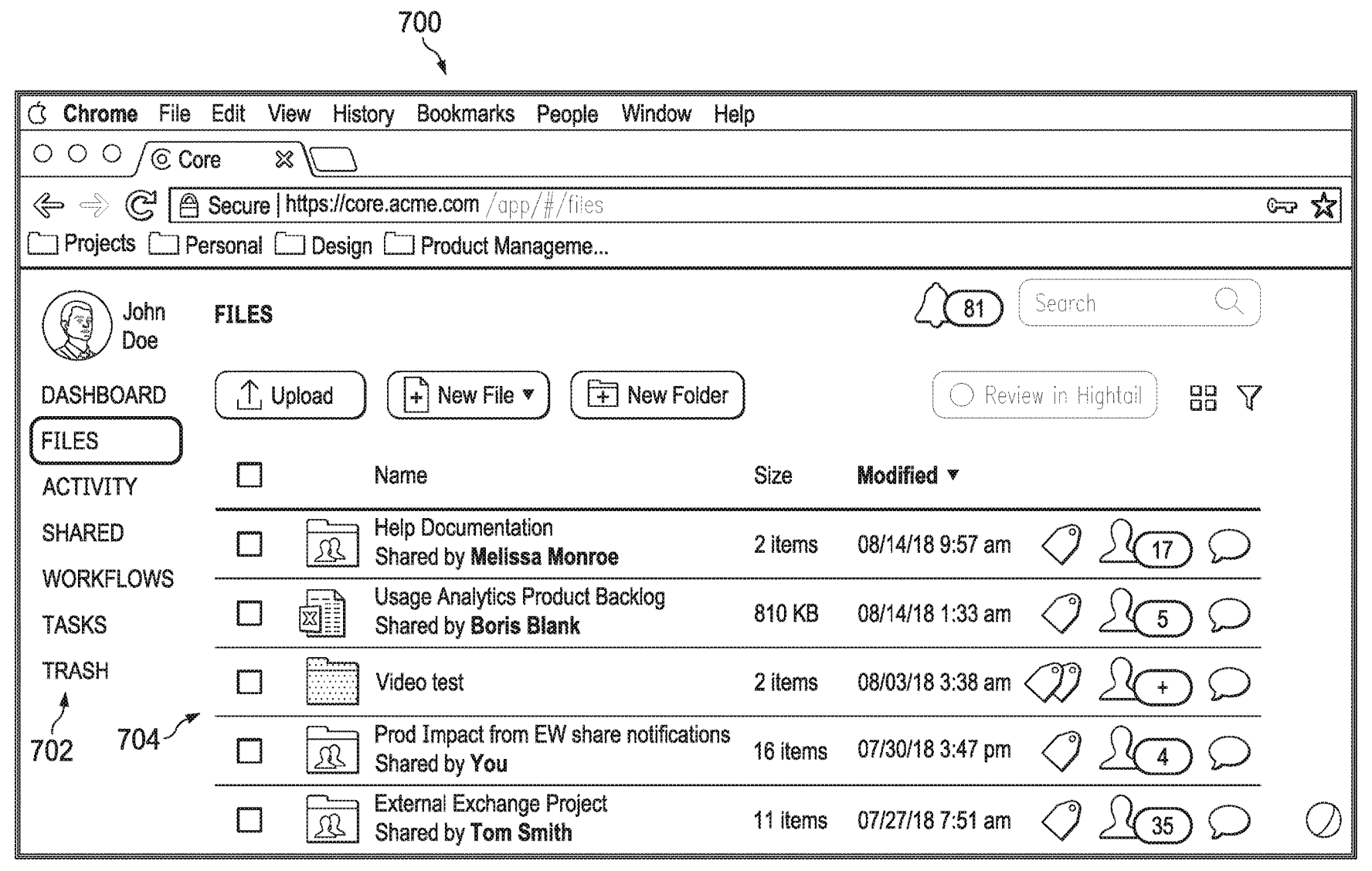

Referring to FIG. 7A, an example of a user homepage 700 is depicted. In this example, the user (John Smith) has several types of functionality that are available from the homepage. The different functions are identified in a menu bar 702 displayed at the left side of the homepage. In this embodiment, menu bar 702 includes "DASHBOARD", "FILES", "ACTIVITY", "SHARED", "WORKFLOWS", "TASKS", and "TRASH" functions. In this figure, the "FILES" function is selected, so the various files that are associated with the user are displayed in a central portion 704 of the page. The displayed files include only those which the user is authorized to access—those files which the user is not authorized access (e.g., files that are owned by different tenant and have not been shared with the user) are not displayed.

In this example, the user is associated with a tenant of the filesharing system that has access to workflow functionality. Consequently, the "WORKFLOWS" function appears on menu bar 702. The user has access to tasks as well, so this also appears on the menu bar. For users that do not have access to workflows and/or tasks, these functions may either be removed by the system from the menu bar when displaying a homepage for those users, or the functions may be grayed out or otherwise displayed to indicate that the functions are not available. Just as the user-accessible files are displayed to the user when the "FILES" button on the menu bar is selected, the user's workflow instances are displayed when the "WORKFLOWS" button is selected, and the tasks accessible by the user are displayed when the "TASKS" is selected.

Figure 7B:
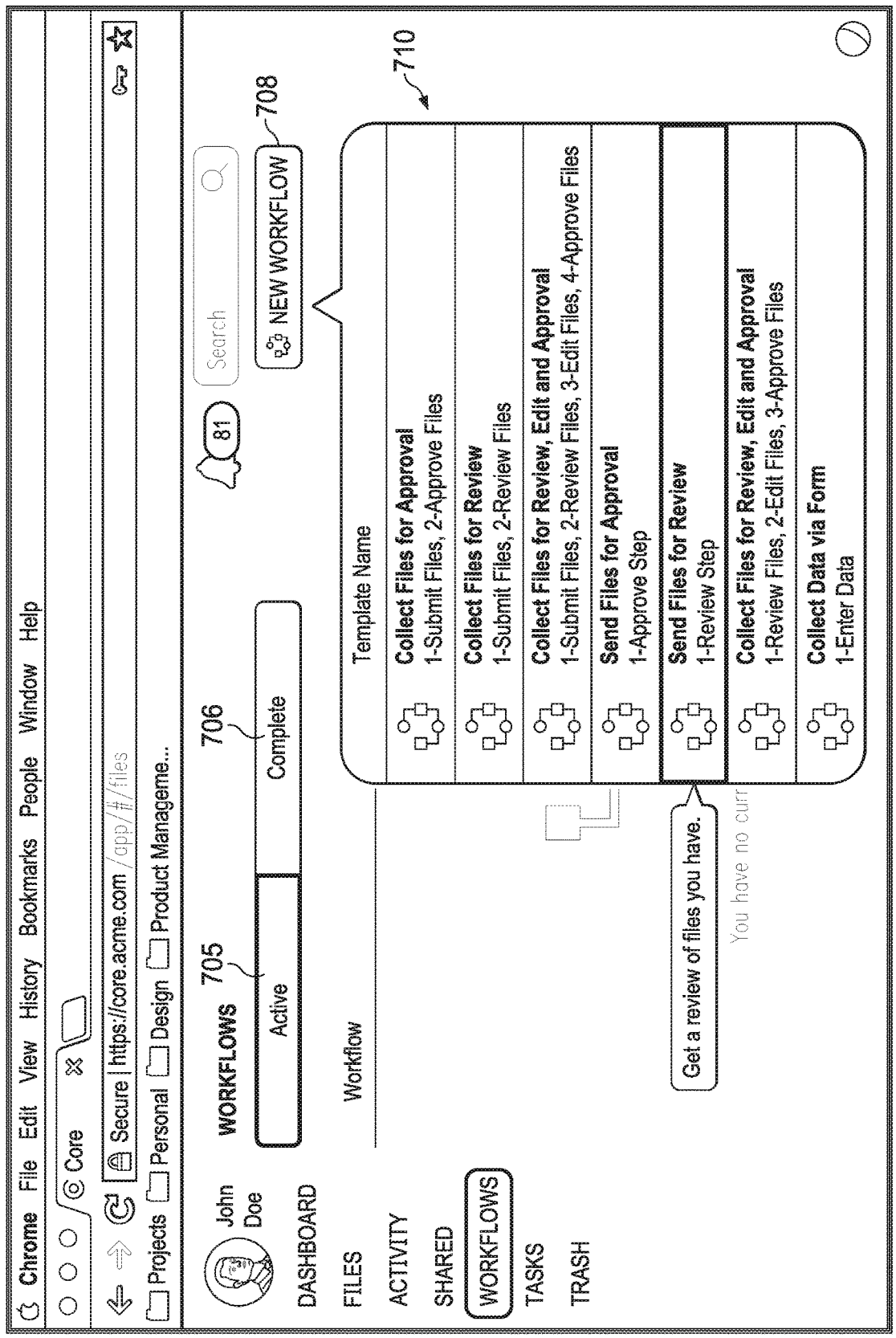

Referring to FIG. 7B, the homepage is depicted with the "WORKFLOWS" function selected on the menu bar. The "WORKFLOWS" display includes buttons 705, 706 at the top of the display which allow the user to alternately view active workflow instances and completed workflow instances. In this example, active workflows button 705 is selected, but the user has no active workflows, so none are displayed. The user may create a new workflow instance by selecting "NEW WORKFLOW" button 708. When this button is selected, the system generates a drop-down menu 710 which includes a list of available workflow templates. Each of the available templates is designed for a different type of workflow and includes workflow components appropriate for the corresponding type of workflow. In some embodiments, the system may also provide the capability for the user to create new workflow templates.

As depicted in FIG. 7B, there are seven available templates, One of the templates that can be selected, for example, is titled "Collect Files for Review, Edit and Approval". In a workflow instance instantiated from this template, an authorized user can assign an external user the task of editing a document. When this task is assigned, the external user obtains authorization through the workflow instance to read the document, as well as modify the document (e.g., add or delete material within the document). In another example, the authorized user may instantiate a workflow instance from the template titled "Collect Data via Form". In this workflow instance, the authorized user can assign an external user the task of entering data in a form (and thereby enter data in a native object, such as a database). The assignment of this task in the workflow instance authorizes the external user to access the form and to enter data in the form (which is then added to the native object), but the external user may not have authorization to modify the form, or to modify the native object (other than to add content to the object).

Figure 7C:
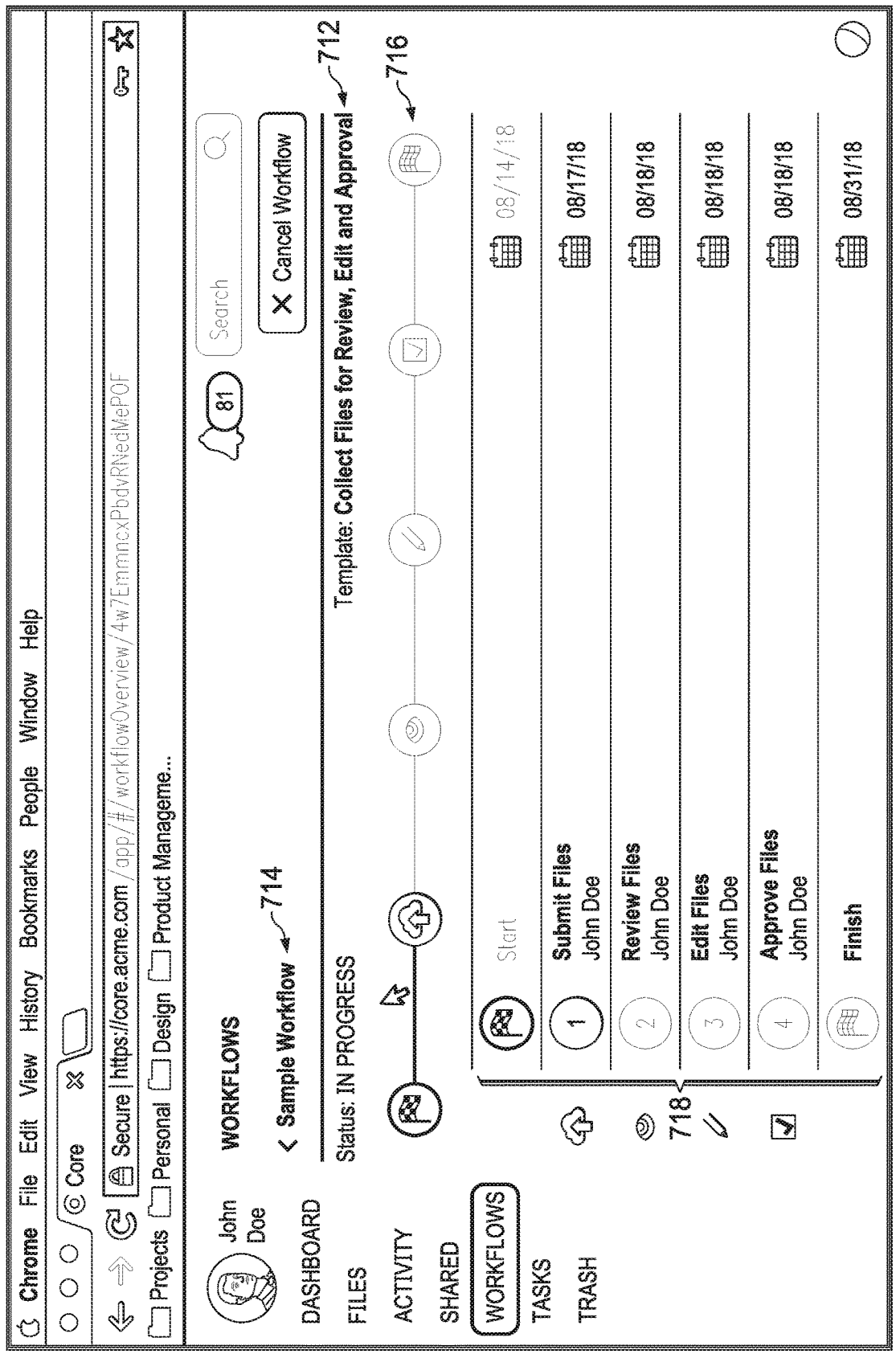

Referring to FIG. 7C, the user has selected a workflow template. The title of the selected template 712 ("Collect Files for Review, Edit and Approval") is shown at the upper right portion of the display. A workflow instance title 714 (in this case the default title "Sample Workflow") is shown in the upper left portion of the display. Below the workflow instance title, a status bar 716 is displayed, and below the status bar, the tasks 718 included in the workflow instance are displayed. The tasks include "Start", "Submit Files", "Review Files", "Edit Files", "Approved Files", and "Finish". In this embodiment, status bar 716 includes an icon for each of the tasks in the workflow. As each task is completed, the icon changes to indicate the completion (e.g., the icon may change color to indicate the state of completion or the amount of time left before the due date).

Figure 7D:
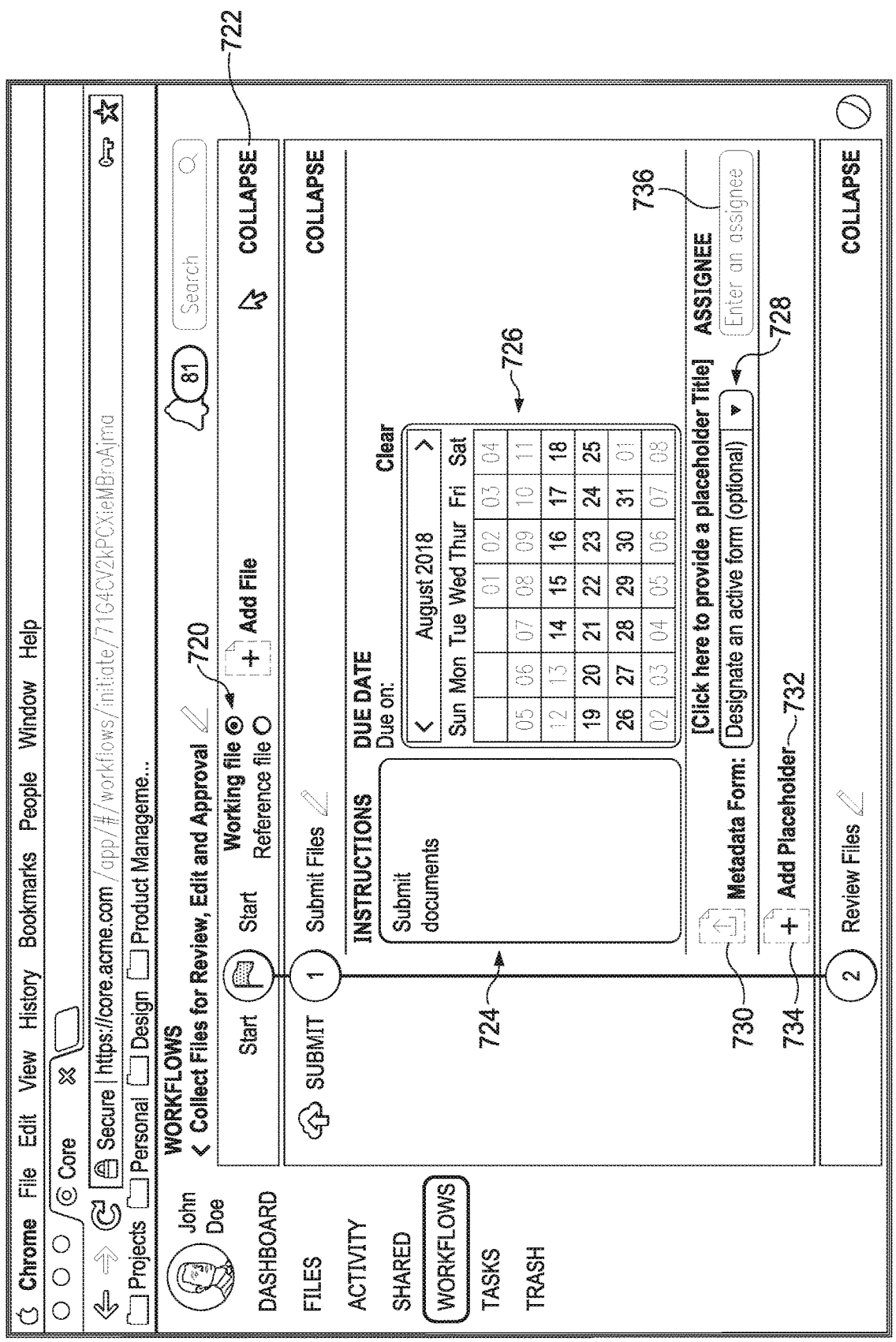

Task list 718 in FIG. 7C is shown with each of the tasks collapsed. Thus, only the title of the task, the person assigned to the task and the due date for the task are shown. The user can select each task to expand the task and display the details for the task. When the task is expanded, the user can enter information to configure the task. For example, as shown in FIG. 7D, the "Start" and "Submit Files" tasks are expanded. Under the "Start" task, the user has the option to add one or more files to the workflow. In this embodiment, the user can designate each file as either a working file or a reference file, as indicated by the corresponding radio buttons 720. Working files in this embodiment can be edited, while reference files are read-only. In the case of workflow instances involving forms that are associated with native content objects, the user can identify the form to be used. In some embodiments, the form has a predetermined association with a specific native object, while in other embodiments, the user may select a native object to be associated with the form and to receive data entered through the form.

When the user selects a file to be attached to the workflow instance, the system checks the user's permission level and verifies that the user has sufficient permission to access the file before it is attached to the workflow instance. As a file is added under the "Start" task, it is displayed in the expanded task when the user has finished adding files under the "Start" task, the task can be collapsed using the button 722 at the upper right portion of the task.

Figure 7E:
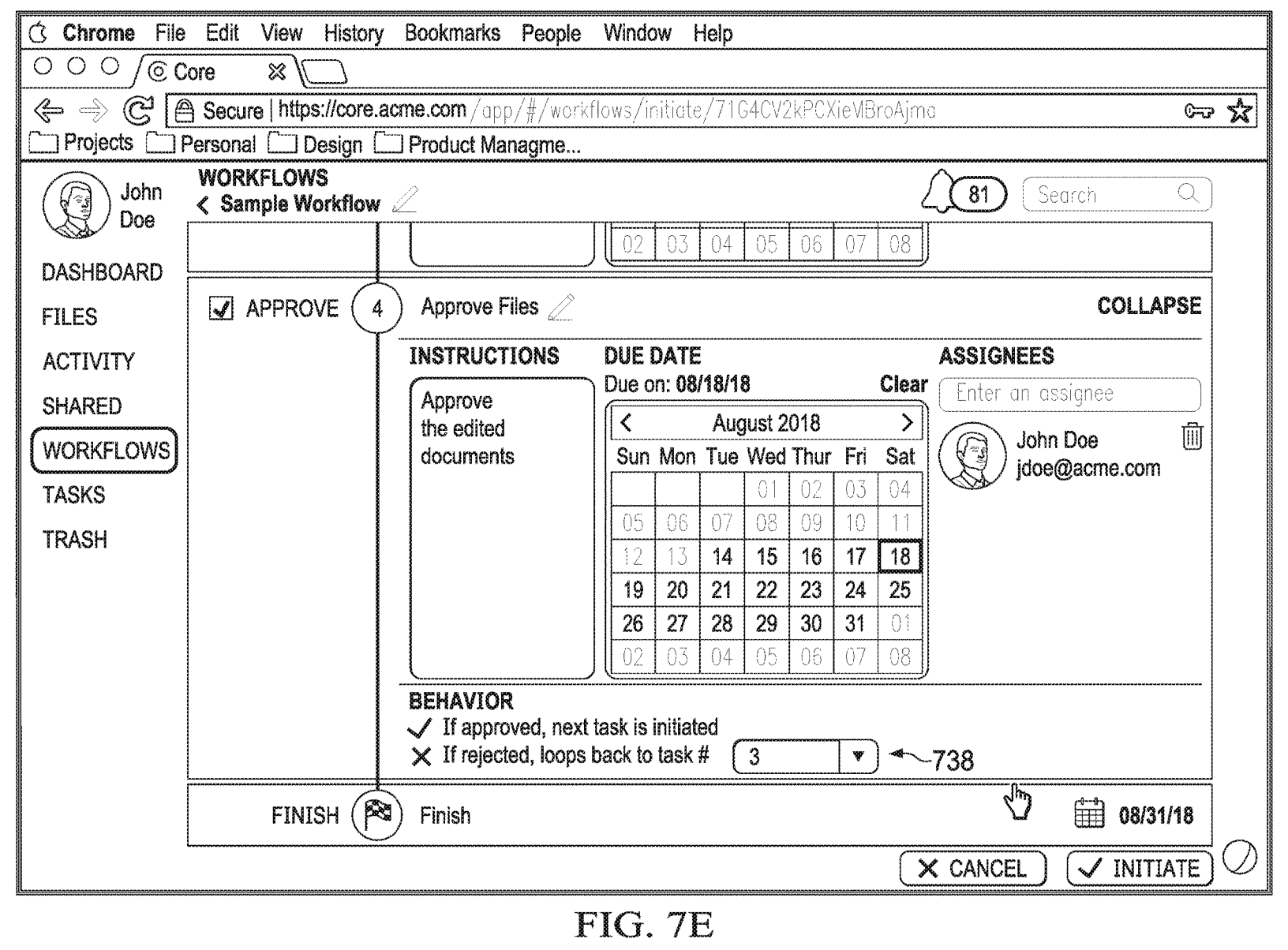

Under the "Submit" task, the user can provide instructions for the task in instruction box 724. A due date for the task can be selected in calendar box 726. A metadata form can be added by selecting a form using 728. If a metadata form is selected, the form will be indicated by document icon 730. The user may add placeholders for documents to be submitted by other users by selecting link 732 and providing a title for the placeholder. Placeholder documents are indicated by Document icon 734. The user can assign the task to a user by entering the user's name in the assignee box 736. After the "Submit" task has been configured by the user, it may be collapsed so that only the task name, due date and person assigned to perform the task are shown. In some embodiments, the system may allow multiple users to be assigned to the same task. In one embodiment, when multiple users are assigned to a task, the first user to begin performing the task acquires a lock for the task, so that no other users can start performing the task In this example, the expanded "Review Files" and "Edit Files" tasks in this configuration display may be very similar to the expanded "Submit" task. In other words, these tasks may include places to enter instructions, due dates, and assignees for the tasks. Metadata forms and document placeholders are not necessary in this embodiment. Referring to FIG. 7E, the expanded "Approved Files" task is shown. Again, there are places to enter instructions for the task, a due date for the task and an assignee for the task. For the "Approved Files" task, a behavior can be specified by choosing a task number in drop down list 738. If the assignee for this task approves the files, the workflow moves to the next task—"Finish". If the assignee does not approve, the workflow returns to the selected task number. In the example depicted in the figure, the workflow would return to task 3 ("Edit Files") if the files are not approved.

After the user has completed the configuration, the workflow instance is saved. The user can access the workflow instance via the "WORKFLOWS" link on menu bar 702. The user may view a list of pending and/or completed workflow instances, and may select one of these instances to view the details of the instance, such as the due dates and state of each task in the workflow instance. As noted above, a particular workflow instance may be viewed as a series of icons representing the tasks in the workflow instance, where the icons may be colored or highlighted to indicate the state of the corresponding task. For instance, completed tasks may be depicted in green, pending tasks may be depicted in yellow, and due (or overdue) tasks may be depicted in red. Specific tasks may be selected to view details associated with that specific task.

The tasks associated with the workflow instance may also be viewed by users that are assigned to the tasks. These non-originating users can also access files that are associated with the tasks in order to perform the tasks. The non-originating users can select the tasks function from the menu bar to see the tasks to which they have been assigned. Individual tasks can be selected to view the related information, such as task instructions, and files to be reviewed, edited, etc. The non-originating users may read or edit files as allowed by the workflow instance, and may enter information to the workflow instance as allowed. For example, the user may enter comments relating to a review of the file(s), where the comments are stored in the workflow instance data structure, rather than within the associated file itself.

When a workflow instance is saved, the tasks that are associated with the workflow instance can be viewed by the assignees of the tasks. In some embodiments, the assignee may be able to view his or her assigned tasks, but may not be able to view the overall workflow instance. The ability to view the workflow instance may be dependent upon the access permissions held by the assigned user. For example, if the assignee user is associated with the same tenant as the user who originated the workflow instance, the assignee user may have permission to view the instance, but if the assignee user is not associated with the same tenant, the assignee user may have permission only to view the specific tasks that are assigned to that user.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer, or a special purpose computer or data processor that is specifically programmed, configured, or constructed to perform the functions described in detail herein. The invention can also be employed in distributed computing environments, where tasks or modules are performed by remote processing devices, which are linked through a communications network such as a local area network (LAN), wide area network (WAN), and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be executable by one or more server machines. Examples of a non-transitory computer readable medium are provided below in this disclosure.

As is known to those skilled in the art, a suitable computer system can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like. ROM, RAM, and HD are non-transitory computer memories for storing computer-executable instructions executable by the CPU or capable of being compiled or interpreted to be executable by the CPU.

Suitable computer-executable instructions may reside on a non-transitory computer readable medium (e.g., ROM, RAM, and/or HD), hardware circuitry or the like, or any combination thereof. Within this disclosure, the term "non-transitory computer readable medium" is not limited to ROM, RAM, and HD and can include any type of data storage medium that can be read by a processor. Examples of non-transitory computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps, and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nano-engineered systems, components, and mechanisms may be used. In general, the functions of the invention can be achieved by any means as is known in the art. For example, distributed, or networked systems, components, and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions executable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the accompanying appendices, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein and in the accompanying appendices, the meaning of "in" includes "in" and "on" unless the context clearly dictates otherwise.

Although the foregoing specification describes specific embodiments, numerous changes in the details of the embodiments disclosed herein and additional embodiments will be apparent to, and may be made by, persons of ordinary skill in the art having reference to this disclosure. In this context, the specification and figures are to be regarded in an illustrative rather than a restrictive sense, and all such modifications are intended to be included within the scope of this disclosure. The scope of the present disclosure should be determined by the following claims and their legal equivalents.

What is claimed is:

1. A method for enabling use of workflows in a multi-tenant environment, the method comprising:
   storing, by a multitenant content sharing system, a plurality of content objects that are encrypted with keys of corresponding tenants;
   enabling, by the multitenant content sharing system, a first user to:
      initiate a workflow instance which is associated with a content object that is accessible by the first user according to tenant access rules of an owner of the content object, wherein when the workflow instance is initiated, a second user is not explicitly authorized to access the content object by the tenant access rules of the owner of the content object;

assign to the second user a task of the workflow instance, wherein the task is associated with the content object; and automatically enabling, by the multitenant content sharing system in response to the first user assigning the second user to the task of the workflow instance, the second user to access the content object associated with the task according to a configuration of the workflow instance.

2. The method of claim 1, wherein the second user is an external user that is not associated with the tenant-owner of the content object.

3. The method of claim 2, wherein the multitenant content sharing system enabling the second user to access the content object comprises the multitenant content sharing system enabling ad hoc authorization of the second user to access the content object without prior system-level authorization of the second user.

4. The method of claim 1, further comprising the multitenant content sharing system storing one or more workflow templates, wherein the multitenant content sharing system enables the first user to initiate the workflow instance comprises enabling the first user to instantiate the workflow as an instance of one of the workflow templates.

5. The method of claim 4, wherein each of the workflow templates comprises a template object that is stored in the data repository, each template object including one or more task attributes, one or more content object attributes and one or more associated user attributes.

6. The method of claim 5, wherein each instance of a workflow template contains metadata defining one or more tasks, one or more content objects and one or more associated users.

7. The method of claim 1, further comprising the multitenant content sharing system, in response to completion of the task of the workflow instance, automatically revoking authorization of the second user to access the content object via association of the content object with the task of according to the configuration of the workflow instance.

8. The method of claim 6, wherein the metadata includes an indicator corresponding to each of the one or more content objects, wherein the indicator indicates whether the content object is a working document or a reference document, and wherein if the indicator indicates that the content object is a working document the multitenant content sharing system enables the second user to edit the content object, and wherein if the indicator indicates that the content object is a reference document the multitenant content sharing system prevents the second user from editing the content object.

9. The method of claim 1, wherein the multitenant content sharing system enabling the second user to access the content comprises decrypting the content object using a decryption key of a tenant-owner of the content object.

10. The method of claim 1, wherein the multitenant content sharing system enabling the first user to associate the content object with the workflow instance comprises:

determining whether the first user is authorized to access the content object according to the tenant access rules of the tenant-owner of the content object, if the first user is authorized to access the content object, enabling the first user to associate the content object with the workflow instance, and if the first user is not authorized to access the content object, preventing the first user from associating the content object with the workflow instance.

11. A system for enabling use of workflow instances in a multitenant environment, comprising:

a processor;

a data repository communicatively coupled to the processor; and a non-transitory computer-readable medium which stores instructions which are executable by the processor to cause the processor to perform:

storing, by a multitenant content sharing system, a plurality of content objects that are encrypted with keys of corresponding tenants;

enabling, by the multitenant content sharing system, a first user to:

initiate a workflow instance which is associated with a content object that is accessible by the first user according to tenant access rules of an owner of the content object, wherein when the workflow instance is initiated, a second user is not explicitly authorized to access the content object by the tenant access rules of the owner of the content object;

assign to the second user a task of the workflow instance, wherein the task is associated with the content object; and automatically enabling, by the multitenant content sharing system in response to the first user assigning the second user to the task of the workflow instance, the second user to access the content object associated with the task according to a configuration of the workflow instance.

12. The system of claim 11, wherein the second user is not associated with the tenant-owner of the content object, and wherein enabling the second user to access the content object comprises enabling ad hoc authorization of the second user to access the content object without prior system-level authorization of the second user.

13. The system of claim 11, wherein the instructions are further executable by the processor to cause the processor to perform storing one or more workflow templates; wherein each of the workflow templates comprises a template object that is stored in the data repository, each template object including at least one attribute selected from the group consisting of a task attribute, a content object attribute, and a user attribute; and wherein enabling the first user to initiate the workflow instance comprises enabling the first user to instantiate the workflow as an instance of one of the workflow templates.

14. The system of claim 13, wherein the at least one attribute includes an indicator corresponding to the content object, wherein the indicator indicates whether the content object is a working document or a reference document, and wherein if the indicator indicates that the content object is a working document the multitenant content sharing system enables the second user to edit the content object, and wherein if the indicator indicates that the content object is a reference document the multitenant content sharing system prevents the second user from editing the content object.

15. The system of claim 11, wherein enabling the second user to access the content comprises decrypting the content object using a decryption key of a tenant-owner of the content object.

16. A computer program product for content sharing through external systems, the computer program product comprising a non-transitory computer-readable medium storing instructions executable by a processor for:

storing, by a multitenant content sharing system, a plurality of content objects that are encrypted with keys of corresponding tenants;

enabling, by the multitenant content sharing system, a first user to:

initiate a workflow instance which is associated with a content object that is accessible by the first user according to tenant access rules of an owner of the content object, wherein when the workflow instance is initiated, a second user is not explicitly authorized to access the content object by the tenant access rules of the owner of the content object;

assign to the second user a task of the workflow instance, wherein the task is associated with the content object; and automatically enabling, by the multitenant content sharing system in response to the first user assigning the second user to the task of the workflow instance, the second user to access the content object associated with the task according to a configuration of the workflow instance.

17. The computer program product of claim 16, wherein the second user is not associated with the tenant-owner of the content object, and wherein enabling the second user to access the content object comprises enabling ad hoc authorization of the second user to access the content object without prior system-level authorization of the second user.

18. The computer program product of claim 16, wherein the instructions are further executable by the processor to cause the processor to perform storing one or more workflow templates; wherein each of the workflow templates comprises a template object that is stored in the data repository, each template object including at least one attribute selected from the group consisting of a task attribute, a content object attribute, and a user attribute; and wherein enabling the first user to initiate the workflow instance comprises enabling the first user to instantiate the workflow as an instance of one of the workflow templates.

19. The computer program product of claim 18, wherein the at least one attribute includes an indicator corresponding to the content object, wherein the indicator indicates whether the content object is a working document or a reference document, and wherein if the indicator indicates that the content object is a working document the multitenant content sharing system enables the second user to edit the content object, and wherein if the indicator indicates that the content object is a reference document the multitenant content sharing system prevents the second user from editing the content object.

20. The computer program product of claim 16, wherein enabling the second user to access the content comprises decrypting the content object using a decryption key of a tenant-owner of the content object.

* * * * *